Dec. 15, 1925.  
J. W. WATSON  
1,565,834  
MOTION CONTROLLING MECHANISM  
Filed March 30, 1920   2 Sheets-Sheet 2
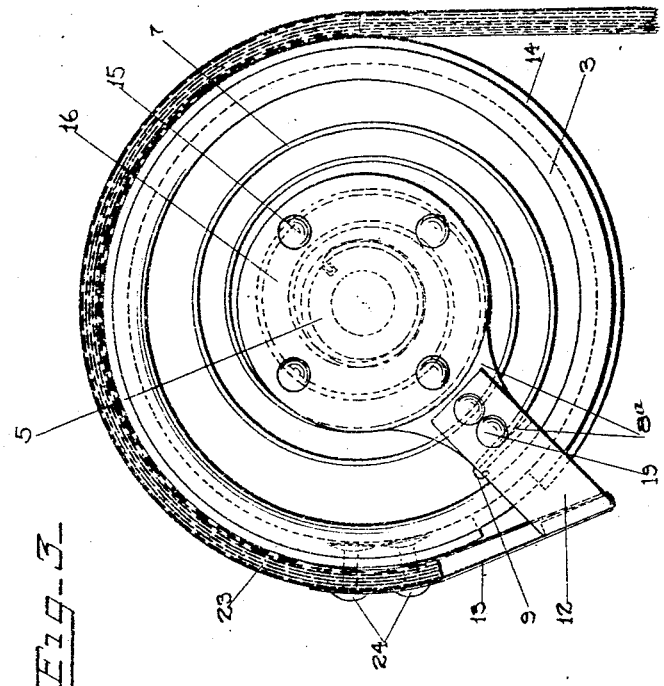
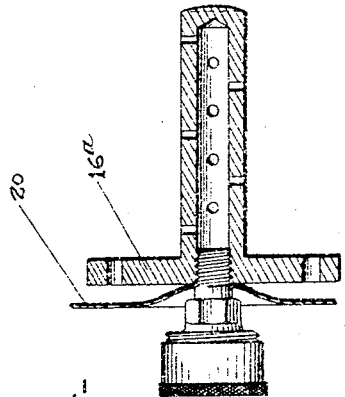
INVENTOR  
John Warren Watson
WITNESS  
Robert F. Nowalk.
BY  
ATTORNEYS Patented Dec. 15, 1925.

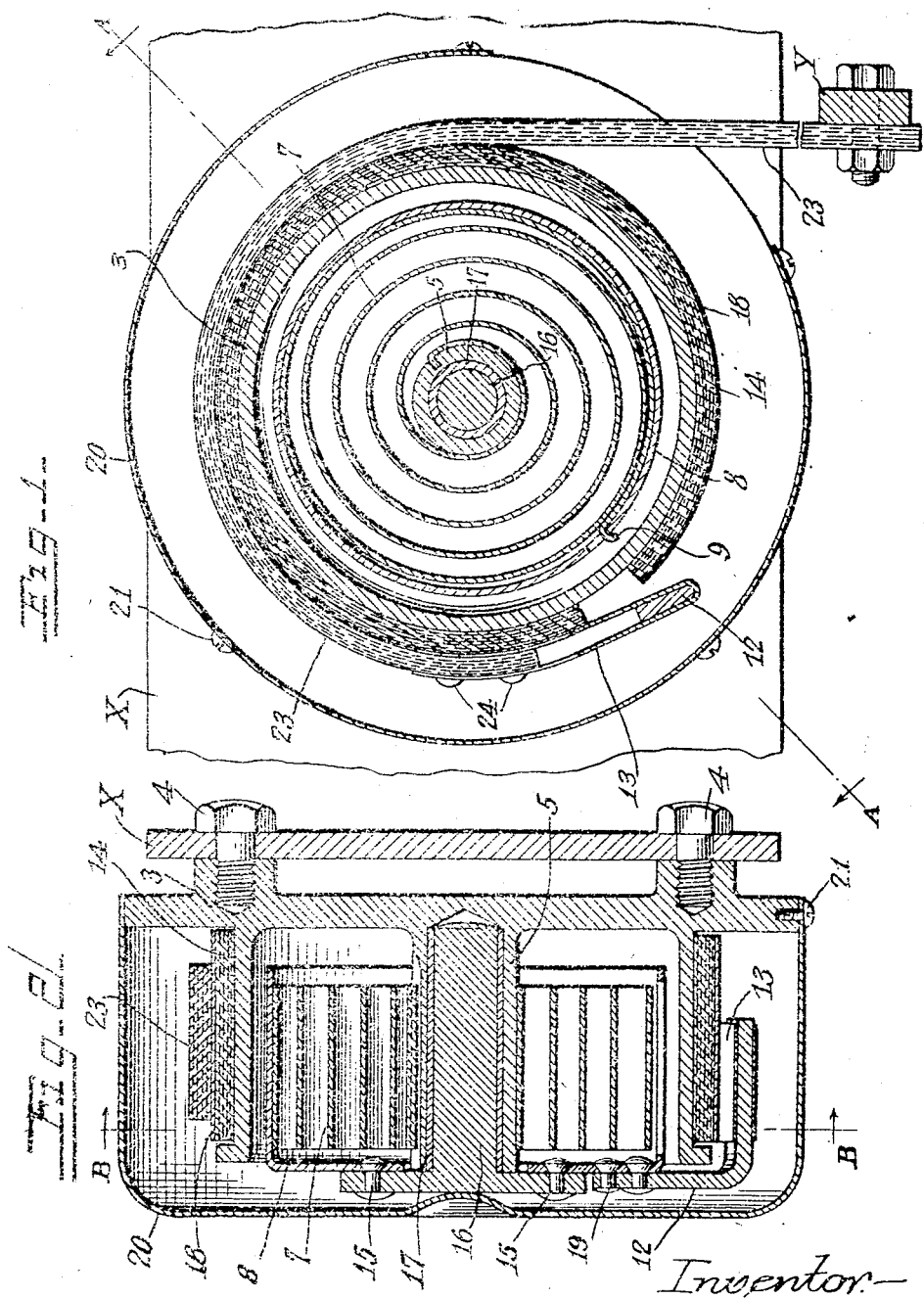

1,565,834

UNITED STATES PATENT OFFICE.

JOHN WARREN WATSON, OF WAYNE, PENNSYLVANIA.

MOTION-CONTROLLING MECHANISM.

Application filed March 30, 1920. Serial No. 369,870.

*To all whom it may concern:*

Be it known that I, JOHN WARREN WATSON, a citizen of the United States, and a resident of Wayne, in the county of Delaware and State of Pennsylvania, have invented certain new and useful Improvements in Motion-Controlling Mechanism, of which the following is a specification, reference being had to the accompanying drawings.

This invention relates to a novel combination for controlling, regulating or checking relative movement in one direction between any two elements, and in particular relates to that class of mechanism intended to check the too rapid separation between the sprung and unsprung portions of a vehicle, and, in particular, a motor vehicle.

A particular object of my invention is to provide a spring-controlled friction mechanism with spring-retaining means for maintaining the spring itself, or any portion of the spring, out of contact with one or more relatively movable parts of the mechanism.

A further object of my invention is to provide a bearing for said spring-retaining means which is of such proportions, and which is so associated with another part of the mechanism, as to insure, for long periods of service, the maintaining of said spring-retaining means in substantially unchanged relation with one of the co-acting friction members.

Various combinations of elements and different means could be readily employed to obtain the results secured by the mechanism disclosed without departing from the spirit and scope of this invention, the illustrations herewith being merely by way of example.

One embodiment of this invention is shown by the accompanying drawings in which Fig. 1 is a sectional view on line BB Fig. 2; Fig. 2 is a sectional view on line AA Fig. 1. Fig. 3 is a side elevation of a modification of my invention; and Fig. 4 is a longitudinal section of a modification of a detail of the invention.

Referring to Fig. 1, X and Y represent relatively movable elements, whose motion, one relative to the other, it is desired to check, regulate or control. These elements are illustrated merely diagrammatically for the purpose of indicating that this invention may be applied and utilized in connection with various combinations of elements which move, one relatively to the other, and whose movement it is desired to effectively control.

Drum member 3 is carried by the element X and is secured thereto by any suitable means such as by cap screws 4. Extending from the drum member 3 is a hollow member 5. Secured to this member 5, as for example by hooking into it, is a spring 7. The other end of spring 7 is secured to a spring retainer 8 by any suitable means such as, for example, by a hook 9, which may, if desired, be formed integral with the spring. This spring retainer 8 may be of the form of a complete ring or drum as shown in Figs. 1 and 2, or may be of any other form such, for example, as that shown in elevation in Fig. 3. The form of spring-retaining means 8ª as shown in Fig. 3 acts only to maintain the outer end of spring 7 out of contact with drum 3. Such abbreviated form of spring retainer will, however, be ample in cases where the length of spring 7, or the adjustment of the spring, is such as to hold the remainder of the outer convolution of the spring tight enough to keep it from rubbing against the inner surface of the drum. Secured to spring retainer 8, as for example by rivets 15, is a flanged member 16 which has its bearing in, and is rotatably supported by, the hollow member 5. If desired, for the purpose of minimizing wear between members 5 and 16, a bushing 17 of any suitable material may be interposed. By the above assembly, comprising members 8 and 16, it will be seen that means is provided for adequately maintaining spring 7 out of contact with drum 3. By this arrangement of parts it will also be seen that the stud portion of member 16 and the hollow member 5 may be made sufficiently long to provide adequate bearing area to insure the travel of spring-retaining member 8 being maintained in substantially concentric relation with drum member 3, and hence in substantially constant relation with friction member 14, for long periods of service. If desired, the flanged member may be hollowed out as shown at 16ª in Fig. 4 to provide a reservoir for lubricant to provide lubrication between members 16 and 5, or the bushing 17, if such bushing is employed. Also secured to member 8, as for example by rivets 19, is a member 12 for transmitting the power of spring 7 to a friction member 14 through any suitable means such as, for example, by means of a strap 13 suitably secured to both friction member 14 and member 12. Friction member 14 may be provided with a backing 18, as shown, if desired, for the purpose of additional strength or for the purpose of flexibly maintaining any given curvature to member 14.

Also secured to friction member 14 as, for example, by means of rivets 24, is a power-transmitting member or strap 23, which strap is secured also to element Y. Cover member 20 is secured to drum member 3 by any suitable means, such as, for example, by screws 21. This cover member 20 is provided with a slot or window for the passage of strap 23.

The drum member 3 and the friction member 14 constitute one type of co-acting friction members, although it is apparent that these members may be made in any other shape than that of a purely cylindrical drum and a split ring, and relatively associated in various other ways than that just described, and still incorporate therein the essentials of my invention. While I have here illustrated but two forms of spring-retaining means and have shown but one example of associating the spring-retaining means with the drum member, it will nevertheless be apparent that these members may be made in other shapes than those illustrated, and may be relatively associated in other ways, and still incorporate therein the essential feature of this invention, which is to provide a single bearing of such proportions, and so arranged with relation to other parts of the mechanism, as to maintain the position of a spring-retaining means for a satisfactorily long period of service.

As attached, in the present instance, to elements X and Y, the invention is operative to retard or control the relative separation of these elements without retarding their relative approach. It is believed that the operation of the device, as shown in the present instance, will require no explanation. To those skilled in the art, it will be readily understood that upon the approach of elements X and Y, the spring 7 will immediately act to revolve friction member 14 around drum 3 in a counter-clockwise direction and will, at the same time, wind up the strap 23 upon friction member 14 to whatever extent the approach of elements X and Y permits. The separation of elements X and Y will be retarded by the friction between member 14 and drum 3. This friction, of course, is augmented by the strength of spring 7 which holds back, in the opposite direction, on member 14.

While I have illustrated and described a preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim and desire to protect by Letters Patent of the United States is:

1. In mechanism for retarding motion between two relatively movable elements, a drum adapted to be secured to one of said elements, a friction member in contact with said drum and adapted to be connected with said other element, a spring so associated with said drum and said friction member as to tend to relatively move them in one direction, a retainer for said spring and a bearing for said retainer, said bearing being supported by the inside of a hollow member located within the inner convolution of the spring.

2. In mechanism for retarding motion between two relatively movable elements, a drum adapted to be secured to one of said elements, a friction member in contact with said drum and adapted to be connected with said other element, a spring so associated with said drum and said friction member as to tend to relatively move them in one direction, a retainer for said spring and a journal for said retainer, said journal being supported by the inside of a hollow member secured to said drum.

3. In mechanism for retarding motion between two relatively movable elements, a drum adapted to be secured to one of said elements, a friction member in contact with said drum and adapted to be connected with said other element, a spring so associated with said drum and said friction member as to tend to relatively move them in one direction, a retainer for said spring, a journal for said retainer, a hollow member in fixed relation with said drum for supporting said retainer against the inner wall of said hollow member, and a bushing between said journal and said hollow member.

4. In mechanism for retarding motion between two relatively movable elements, a drum member adapted to be secured to one of said elements, a friction member in contact with said drum member and adapted to be connected with said other element, a spring so associated with said drum member and said friction member as to tend to relatively move them in one direction, a retainer for said spring and a hollow member protruding from said drum member and serving, on the inside thereof, to support said spring retainer and on the outside thereof to support the inner convolution of said spring.

5. In mechanism for retarding motion between two relatively movable elements, a drum member adapted to be secured to one of said elements, a friction member in contact with said drum member and adapted to be connected with said other element, a spring so associated with said drum member and said friction member as to tend to relatively move them in one direction, means for maintaining the travel of said spring in substantially concentric relation with the drum portion of said drum member, and a hollow member constructed and arranged to be held in fixed relation with said drum member and serving to support, on its outside surface, the inner convolution of said spring, and serving to support, on its inside surface, said travel-maintaining means.

6. In mechanism for retarding motion between two relatively movable elements, a drum member adapted to be secured to one of said elements, a friction member in contact with said drum member and adapted to be connected with said other element, a spring so associated with said drum member and said friction member as to tend to relatively move them in one direction, means for maintaining the travel of said spring in substantially concentric relation with the drum portion of said drum member, and a hollow member constructed and arranged to be held in fixed relation with said drum member, and serving unaided to carry a bearing capable of supporting said travel-maintaining means in substantially concentric rotative relation with said drum portion of said drum member, said bearing being against the inner wall of said hollow member.

7. In mechanism adapted for use in connection with two relatively movable elements for checking their relative motion in one direction, a drum adapted to be secured to one of said elements, a friction member, in the form of a split ring, in contact with said drum and adapted to be connected with said other element by a flexible member, a spring so associated with said drum and said friction member as to tend to rotate said friction member around said drum and also to wind said flexible member upon said friction member, said flexible member being attached to said friction member adjacent one end thereof which makes it possible for the device to operate throughout its working range without necessitating that said flexible member be wound upon said friction member beyond the gap in said friction member, means for holding the outer end of said spring out of contact with said drum and a single bearing capable of maintaining, with relation to said drum, the rotative position of said last-mentioned means, said bearing having a diameter less than the mean diameter of the outer convolution of said spring.

8. In mechanism adapted for use in connection with two relatively movable elements for checking their relative motion in one direction, a drum adapted to be secured to one of said elements, a friction member, in the form of a split ring, in contact with said drum and adapted to be connected with said other element by a flexible member, a spring so associated with said drum and said friction member as to tend to rotate said friction member around said drum and also to wind said flexible member upon said friction member, said flexible member being attached to said friction member adjacent one end thereof which makes it possible for the device to operate throughout its working range without necessitating that said flexible member be wound upon said friction member beyond the gap in said friction member, means for holding a portion of said spring out of contact with said drum and a single bearing for maintaining, with relation to said drum, the rotative position of said last-mentioned means, said bearing having a diameter less than the mean diameter of the outer convolution of said spring.

9. In mechanism adapted for use in connection with two relatively movable elements for checking their relative motion in one direction, a drum adapted to be secured to one of said elements, a friction member, in the form of a split ring, in contact with said drum and adapted to be connected with said other element by a flexible member, a spring so associated with said drum and said friction member as to tend to rotate said friction member around said drum and also to wind said flexible member upon said friction member, said flexible member being attached to said friction member adjacent one end thereof which makes it possible for the device to operate throughout its working range without necessitating that said flexible member be wound upon said friction member beyond the gap in said friction member, a member for maintaining the outer end of said spring out of contact with said drum and a member in fixed relation with the drum, said fixed member being hollow to provide a bearing for said spring-maintaining member.

10. A rebound absorber for spring-mounted vehicles comprising two relatively movable members adapted to be connected to the body and axle respectively of the vehicle, and provided with variably overlapping frictional surfaces, one of which is fixed and substantially rigid, and the other flexible for producing a braking action between the two relatively movable members, to resist frictionally the separation of the body and axle, tensioning means for drawing the flexible friction surface into contact with the fixed friction surface, substantially the total contacting being in direct ratio to the amount of compression of the springs connecting said body and axle, whereby said frictional resistance to their separation is substantially proportioned to the amount of compression of the springs.

11. A rebound absorber constructed as set forth in claim 10 in which the friction surfaces are cylindrical in shape and concentric in arrangement.

12. A rebound absorber for spring mounted vehicles comprising a stationary drum connected to one of two relatively movable parts; a flexible strap or band adapted to be wrapped round the drum and connected by one end to the other of said relatively movable parts; and a spring actuating the other end of the strap and adapted to overlap the strap around the drum thus providing for frictional resistance to the separation of the two relatively movable parts, the parts being arranged and proportioned so that approximately the total amount of overlap is substantially in direct ratio to the amount of the compression of the springs connecting the two relatively movable parts.

13. A rebound absorber for spring mounted vehicles comprising a stationary drum connected to one of two relatively movable spring-connected parts; a flexible strap or band adapted to be wrapped round the drum and connected by one end to the other of said relatively movable parts and a spring actuating the other end of the strap and adapted to overlap the strap around the drum, thus providing for frictional resistance to the separation of the two relatively movable parts, the parts being arranged and proportioned so that approximately the total amount of overlap is substantially in direct ratio to the amount of the compression of the springs connecting the two relatively movable parts, the spring actuating the strap being of relatively great resiliency and length so as to act with substantially constant tension over the range of overlapping of the strap.

14. A rebound absorber for vehicles comprising a stationary drum connected to one of two relatively movable parts; a flexible strap or band adapted to be wrapped about the drum and connected by one end to the other of said relatively movable parts; and spring means actuating the other end of the strap and adapted to overlap the strap around the drum thus providing for frictional resistance to the separation of the two relatively movable parts, said drum being of circumference substantially equal to the possible relative motion between the strap and the drum.

15. A rebound absorber for spring mounted vehicles comprising a stationary snubber part provided with a cylindrical braking surface; a snubber part journaled concentric with the said braking surface and rotatable through substantially a complete circle; a flexible strap secured to the last-mentioned snubber part and adapted to be wrapped around the cylindrical braking surface, the said surface being of a circumference substantially equal to the possible relative motion between the strap and said surface; and a spring tending to rotate one snubber part on the other to wrap the strap on the cylindrical braking surface, the normal overlap being substantially not less than equal to the normal static compression of the vehicle springs.

16. A rebound absorber including a fixed drum and a flexible member held therearound under tension, said flexible member connecting two movable parts, with approximately its total area of frictional contact upon the drum increased in substantial proportion to the approach of the fixed and movable part to each other.

17. In mechanism adapted for use in connection with two relatively movable elements for checking their relative motion in one direction, a drum adapted to be secured to one of said elements, a flexible member adapted to be secured to the other of said elements, a spring connecting said drum and said flexible member and tending to increasingly overlay the flexible member around the drum, means for holding a portion of said spring out of contact with said drum, and a bearing for said means, said bearing lying within the inner convolution of said spring, said inner convolution being held in substantially fixed relation with said drum.

In witness whereof, I have hereunto set my hand this 29th day of March, A. D. 1920.

JOHN WARREN WATSON.